No. 774,073. PATENTED NOV. 1, 1904.
J. W. HAMM & A. F. BRUCKNER.
CLOTHES POUNDER.
APPLICATION FILED JAN. 27, 1904.
NO MODEL.
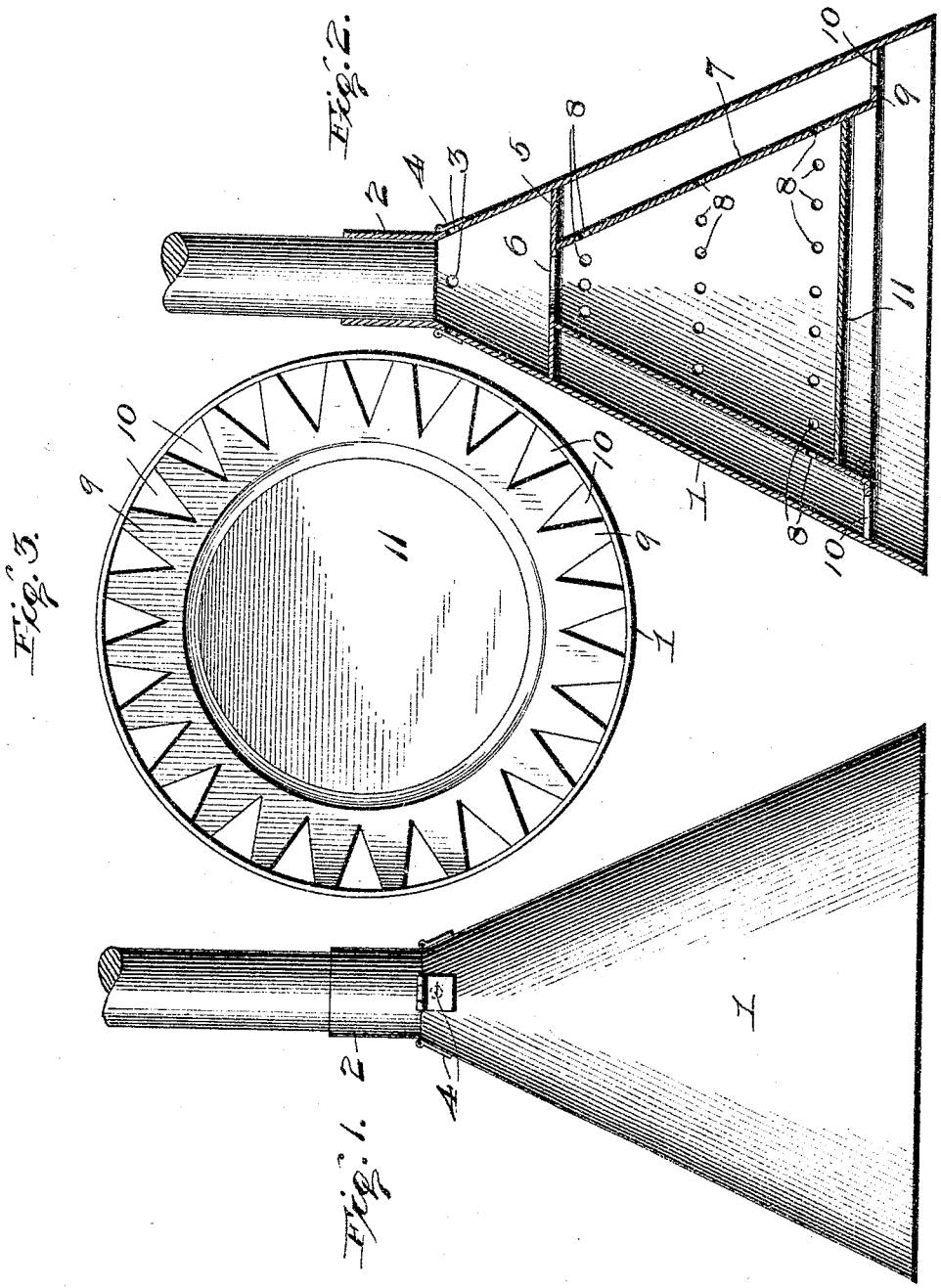
WITNESSES:
INVENTORS
John W. Hamm
Arthur F. Bruckner
BY Edson Bros.
Attorneys.

No. 774,073.                                   Patented November 1, 1904.

UNITED STATES PATENT OFFICE.

JOHN W. HAMM AND ARTHUR F. BRUCKNER, OF ELGIN, ILLINOIS, ASSIGNORS TO ELGIN SUCTION WASHER COMPANY, OF ELGIN, ILLINOIS, A CORPORATION OF ILLINOIS.

CLOTHES-POUNDER.

SPECIFICATION forming part of Letters Patent No. 774,073, dated November 1, 1904.

Application filed January 27, 1904. Serial No. 190,896. (No model.)

*To all whom it may concern:*

Be it known that we, JOHN W. HAMM and ARTHUR F. BRUCKNER, citizens of the United States, residing at Elgin, in the county of Kane and State of Illinois, have invented certain new and useful Improvements in Clothes-Pounders; and we do hereby declare the following to be a full, clear, and exact description of the invention, such as will enable others skilled in the art to which it appertains to make and use the same.

Our invention relates to clothes-washing machines.

It has for its object to lessen the wear on the clothes by providing a suction-washer of simple and inexpensive construction.

The invention consists of the details of construction and combination of parts hereinafter described, and more particularly pointed out in the claims.

In the accompanying drawings, illustrating the preferred construction of our invention, Figure 1 is a side elevation of the washer. Fig. 2 is a sectional view taken vertically through the washer, Fig. 1; and Fig. 3 is a bottom view of the device.

Referring more particularly to the drawings, the device consists of an outer conically-shaped casing 1, made preferably of sheet metal, having a socket 2 at its smaller end for the insertion of a suitable handle. Said casing is provided with openings or perforations 3 therein just below its juncture with the handle-socket, and flaps 4 adapted to fit over said perforation. A partition 5, also preferably of sheet metal, is arranged transversely of the casing a short distance below the perforations 3, and is itself provide with a central opening 6. Within the outer casing and depending from the partition 5 is another conical casing, 7, extending down to within a short distance of the outer extremity of the outer casing and provided with perforations 8. Said inner and outer casings are connected on a level with the edge of the inner casing by a partition 9, having, preferably, V-shaped perforations 10 therein. The inner casing or cone is closed near its base by a preferably imperforate plate 11.

As usually made, the device stands about fifteen inches high, the outer casing is ten inches across its larger end, and the inner casing six and one-half inches across its outer end.

In operating the device, the washer is grasped by its handle and pushed down into the tub on the clothes in the usual manner. When this operation is performed, the water will enter the space between the inner and outer casings through the opening 10, through the perforations 8 into the inner casing, through the opening 6 in the plate or partition 5 into the compartment above the same, and out through the holes 3, their flaps being raised thereby. As the washer is raised it causes a suction from the bottom of the tub through the clothes owing to the closing of the holes 3 by the flaps 4. This suction or drawing of the water through the clothes takes out all dirt and grease, while at the same time there is no wear or tear on the clothes, as there is no rubbing to be done.

It is understood that we do not limit ourselves as to the details of construction shown and described herein, as they may be changed at will and the spirit of our invention remain intact and be protected.

Having thus described our invention, what we claim as new, and desire to secure by Letters Patent, is—

1. In a device of the character described, an outer casing, an inner casing, a compartment arranged above said inner casing and inclosed by the walls of the outer casing, a partition cutting off direct communication between said compartment and the space surrounding the inner receptacle and means whereby the water passes into the space between said casings, from thence to the inner casing, thence into the compartment above said inner casing and out through perforations in the outer casing.

2. In a device of the character described, an outer casing, an inner perforated casing, closed at one end by an imperforate partition arranged below the perforations in said inner casing, a compartment arranged above, and having communication with said inner casing, a perforated partition closing the space between said casings, said outer casing having perforations therein.

3. In a device of the character described, an outer casing, an inner perforated casing, closed at one end by an imperforate partition, a compartment arranged above, and having communication with said inner casing, a perforated partition closing the space between said casings, said outer casing having perforations therein, and flaps adapted to close said latter perforations.

4. In a device of the character described, a conical outer casing having a handle-socket at its smaller end, an inner conical casing arranged concentrically of the outer casing, a compartment arranged above said inner casing and inclosed by the walls of the outer casing, said compartment connecting with the chamber formed by the inner casing, and having perforations in its outer walls, and means whereby water passes from the space between said casings into the chamber formed by the inner casing, thence into the compartment above the inner casing, and out through said perforations in said compartment, means whereby suction is created when the washer is withdrawn from the tub.

5. In a device of the character described, a conical outer casing having a handle-socket at its smaller end, an inner conical casing arranged concentrically of the outer casing, a compartment arranged above said inner casing and inclosed by the walls of the outer casing, said compartment connecting with the chamber formed by the inner casing and having perforations in its outer walls, flaps adapted to cover said perforations, and means whereby water passes from the space between said casings into the chamber formed by the inner casing, thence into the compartment above the inner casing and out through said perforations in said compartment.

In testimony whereof we affix our signatures in presence of two witnesses.

JOHN W. HAMM.
ARTHUR F. BRUCKNER.

Witnesses:
  E. B. QUACKENBUSH,
  F. R. ALLEN.